United States Patent Office 3,364,155
Patented Jan. 16, 1968

3,364,155
ADHESIVE CONTAINING DIENE RUBBER
AND OLEFIN COPOLYMER
Robert David Souffie, Wilmington, Del., assignor to E. I.
du Pont de Nemours and Company, Wilmington, Del.,
a corporation of Delaware
No Drawing. Filed Feb. 17, 1964, Ser. No. 345,130
2 Claims. (Cl. 260—4)

This invention relates to a new solvent dispersion of a blend of elastomers and, more particularly, to adhered structures obtainable using the dispersion as an adhesive composition.

Normally-solid, chain-saturated α-olefin hydrocarbon copolymers are becoming increasingly important today for making a wide variety of useful products. For many applications adhered assemblies are needed wherein articles made from these copolymers are bonded to each other or to articles made from other elastomers such as natural rubber, styrene-butadiene rubber (SBR) and neoprene. A particularly important example is the joining of α-olefin copolymer tread or white wall stock to a styrene-butadiene rubber carcass in the manufacture of automobile and truck tires. When one undertakes to construct a tire from elastomeric articles having poor tack, it may take up to three times as long to accomplish the fabrication as it would if relatively high-tack rubbers are used. For this reason it is apparent that a satisfactory adhesive is required which not only provides a strong bond after cure, but imparts tack to facilitate the building of the composite assembly before vulcanization. Unfortunately, all the α-olefin hydrocarbon copolymer stocks are rather deficient in tack, especially those of higher Mooney viscosity, e.g., (ML–4/212° F.) value of 85; this shortcoming makes it particularly inconvenient and uneconomical to construct a whole tire or recaps or white walls from an α-olefin hydrocarbon copolymer.

It has unexpectedly been found that articles displaying exceptional cohesive tack both before and after curing can be prepared by joining a curable α-olefin hydrocarbon copolymer article to another curable elastomeric article employing the novel composition of this invention which comprises a dispersion in an inert organic solvent of (1) a conjugated diene elastomer having at least about 10 gram-moles of sulfur-curable carbon-to-carbon double bonds per kilogram, and (2) a low molecular weight hydrocarbon copolymer of at least one α-monoolefin with at least one non-conjugated diene having a Mooney viscosity below about 38 and having at least about 1 gram-mole of sulfur-curable carbon-to-carbon double bonds per kilogram, the amount of said copolymer (2) ranging from about 70 to 80 percent of the total weight of ingredients (1) and (2).

This composition is very useful for improving the cohesion of normally solid sulfur-curable chain-saturated α-olefin hydrocarbon copolymers (such as ethylene/propylene/1,4-hexadiene copolymers having a Mooney viscosity (ML–4/212° F.) of about 85) and in adhering these copolymers to curable conjugated diene elastomers such as natural rubber, styrene-butadiene rubber, cis-polybutadiene, cis-polyisoprene and neoprene. It is merely necessary to apply a thin coating to the surface by any conventional method. When dry, the coated article is ready for making composite assemblies.

One of the critical components in the compositions of the present invention is a sulfur-curable low Mooney α-olefin hydrocarbon copolymer having at least about 1 gram-mole of carbon-to-carbon double bonds per kilogram. In general, these are made from at least one α-monoolefin and at least one non-conjugated diene. The α-monoolefins are those having the structure R—CH=CH$_2$ where R is H or C$_1$—C$_1$—C$_{16}$ alkyl, preferably straight-chained. Representative dienes include: openchain C$_6$—C$_{22}$ dienes having the structure

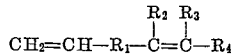

wherein R$_1$ is an alkylene radical, R$_2$, R$_3$, and R$_4$ are independently selected from the group consisting of hydrogen and alkyl radicals; dicyclopentadiene; and a 2-alkyl-2,5-norbornadiene; cyclopentadiene; and 1,5-cyclooctadiene.

Representative procedures for making copolymers using these α-monoolefins and the above-described non-conjugated dienes are given in U.S. Patents 2,933,480, 3,000,-866, 3,063,973, 3,093,620 and 3,093,621. When cyclic non-conjugated dienes are employed, it is preferred that the reaction mixture contain ethylene and at least one other α-monoolefin. The copolymer should contain about 20 to 75 weight percent ethylene monomer units if it is to be rubber-like.

In order that this copolymer be co-curable it is believed that there should be at least one gram-mole of sulfurcurable (ethylenic) unsaturation per kilogram. For a representative ethylene/propylene/1,4-hexadiene copolymer this value corresponds to about 8% by weight of unsaturated diene units. The C=C content is determined as set forth in detail near the end of this specification.

A critical feature of this copolymer is its Mooney viscosity (ML–4/212° F.) which should not exceed about 38. It has been found that the tack imparted by the subject composition decreases as the Mooney viscosity of the α-olefin copolymer component increases. Values below about 30 are preferred. It is believed that low-Mooney stocks (e.g., ML–4/212° F.=15) made by oil extending high-Mooney stocks (e.g., ML–4/212° F.=100) will not be suitable. The Mooney viscosity is measured in accordance with ASTM Procedure 1646–61.

The low-Mooney viscosity copolymers can be made by mechanically peptizing the high-Mooney type (e.g., those having Mooneys of 70 to 100) by applying strong shear at temperatures beginning at 125° C. It has been found that the temperature at which the shearing is applied should initially be at least 125° C. to get rapid peptization; if the temperature is significantly lower, for example 75° C., the breakdown does not occur at a satisfactory rate. The temperature for carrying out the mechanical peptization frequently ranges as high as 170–200° C. Adequate shear must be provided in addition to the proper temperature. Shearing with Banbury mixers, Struthers-Wells mixers, and other typical internal mixers is suitable. Open mixers, such as rubber roll mills, are inefficient and not preferred.

Alternatively, the low-Mooney viscosity copolymers can be made by modifying the copolymerization conditions. For example, hydrogen can be introduced as described in U.S. Patent 3,051,690. Alternatively, the catalyst concentration in the reactor can be increased until the product copolymer has a Mooney viscosity low enough to be suitable for use in this invention. In general, it is preferred to use hydrogen modification because hydrogen is cheap whereas the catalyst is expensive.

In place of a single α-olefin copolymer having at least about 1 gram-mole/kilogram of sulfur-curable unsaturation, a blend of α-olefin copolymers can be employed. It is not necessary that all the α-olefin copolymers in this blend have this minimum amount of unsaturation; as long as the individual component copolymers have at least about 0.3 gram-mole/kilogram of sulfur-curable unsaturation and the blend as a whole has at least about 1 gram-mole/kilogram, the blend should be suitable. A valuable 3-component composition comprises a compounded solvent dispersion of a low molecular weight α-olefin hydrocarbon copolymer, a high diene content α-olefin copolymer, and a conjugated diene elastomer; said low molecular weight copolymer amounting to 40 to 50% by weight of total polymer present and being characterized as a sulfur curable copolymer of at least one α-monoolefin and at least one non-conjugated diene, having a Mooney viscosity (ML–4/100° C.) of about 25 or less, and having about 0.3 to 2 gram-mole of carbon-carbon double bonds per kilogram; said high-diene copolymer amounting to about 25 to 35% by weight of total polymer and being characterized as a sulfur-curable copolymer of at least one α-olefin and at least one non-conjugated diene, having a Mooney viscosity (measured as before) not exceeding about 50, and having at least about 2.4 gram-moles of carbon-carbon double bonds per kilogram; said conjugated diene elastomer amounting to 20 to 30% by weight of total polymer and being characterized as previously described.

Particularly valuable α-olefin copolymers having a high degree of unsaturation are made from ethylene and 1,4-hexadiene in inert liquid media with coordination catalysts in accordance with the general procedures of U.S. Patent 2,933,480. The preferred catalyst is prepared by mixing about one molar proportion of vanadium tris (acetyl-acetonate) with 7.5 molar proportions of diisobutyl aluminum chloride. The copolymer can also be made in the presence of catalysts prepared by mixing vanadyl chloride or vanadium tetrachloride and organo aluminum compounds such as diisobutyl aluminum monochloride. The preferred concentration of vanadium in the copolymerization reaction zone ranges from about 0.0002 to 0.001 gram-atom per liter; however, it may be employed in higher or lower concentrations, if desired. It is frequently preferred to introduce the catalyst after the hexadiene has been added to the reactor, but before the introduction of the highly reactive ethylene (which is frequently admixed with nitrogen).

Representative liquids for making ethylene/1,4-hexadiene copolymer include halogenated hydrocarbons such as tetrachloroethylene, carbon tetrachloride, methylene chloride, ethyl chloride and 1,2-dichloroethane; liquid paraffins and cycloparaffins such as pentane, cyclohexane, 2,2,4-trimethylpentane and n-octane; and aromatic hydrocarbons such as benezene, toluene, and mixed xylenes.

Still another essential component of the composition of the present invention is the conjugated diene elastomer. It is characterized by having at least about 10 gram-moles of sulfur curable carbon-carbon double bonds; they are supplied by the units derived from the conjugated diene monomer. Representative examples of these rubbers include: natural rubber; butadiene-styrene rubbers (SBR); polychloroprenes such as "neoprene Type W," "neoprene Type WHV" and "neoprene Type WRT;" isoprene rubber; butadiene rubber; acrylonitrile-butadiene rubber; acrylonitrile-chloroprene rubbers; vinyl pyridine-butadiene rubbers; styrene-chloroprene rubbers; styrene-isoprene rubbers. The nomenclature employed for describing these rubbers is taken from paragraph 4(a) of ASTM D 1418–58T, tentative recommended practice for nomenclature for synthetic elastomers and latices. Representative commercially available elastomers of this type and their suppliers are more particularly described in Compounding Ingredients for Rubbers, third edition, Cuneo Press of New England, Cambridge, Mass., compiled by the editors of Rubber World, 630 3rd Avenue, New York, N.Y., pages 555–591, 591, 595–608, 614-627. Diene polymers and copolymers are described also in Synthetic Rubber, G. S. Whitby, Editor-in-Chief, John Wiley & Sons, Inc., New York, 1954, Chapters 21, 22 and 23. Diene polymers and copolymers are also described in Introduction to Rubber Technology, edited by M. Morton, Reinhold Publishing Corp., New York, 1959, Chapters 3 (Natural Rubber), 10 (SBR), 11 (Nitrile Rubbers), and 13 (Neoprene). Further descriptions are contained in Synthetic Rubber Technology, volume I, W. S. Penn, Maclaren and Sons, Ltd., London, 1960, Chapters 3 (SBR), 20 (Neoprene), and 28 (Nitrile Rubbers). Additional information is given in Rubber, Fundamentals of Its Science and Technology, J. Le Bras, Chemical Publishing Company, Inc., New York, 1957, pages 288–289, 292, 294–314. Processes for making diene polymers are described in the patents tabulated in the review book Linear and Stereoregular Addition Polymers, N. G. Gaylord and H. F. Mark, Interscience Publishers, New York, 1959; pages 368–371 (polybutadiene), 372–375 (polyisoprene), 376–377 (chloroprene, dimethylbutadiene), 382–389 (α-olefin/conjugated diene copolymers), 390–391 (butadiene/isoprene copolymer), 398–399 (polybutadiene), 400–405 (polyisoprene), 406–407 and 454–455.

The preferred diene rubbers include natural rubber, SBR, acrylonitrile-styrene rubber, 1,4-polybutadiene, and cis-1,4-polyisoprene. The preferred SBR rubber contains about 54–97 weight percent butadiene monomer units; the particularly preferred SBR incorporates about 23.5 weight percent styrene units, has a Mooney (ML–4/100° C.) viscosity of about 46–54 and has a viscosity-average molecular weight of about 270,000. The particularly preferred polybutadienes have at least about 90 percent cis-1,4-units. These copolymers are more particularly described in U.S. Patents 2,913,444, 2,979,488, and 2,999,089; further processes for their preparation are given in German Patent 1,112,834. Polybutadiene containing a lower cis content and still suitable for use is described in U.S. Patents 2,908,672 and 2,908,673. The polyisoprene preferred is largely made up of 1,4-monomer units of which about at least 90 percent are cis. Preparation of these polymers is more particularly described in U.S. Patents 2,849,432, 2,856,391, 2,908,672, 2,908,-673, 2,913,444, 2,977,349 and 2,979,494.

The adhesive of the present invention is made up as a homogeneous dispersion in a volatile inert organic liquid. In addition to the polymers, optional additives such as fillers and antioxidants may be present. The ability of the adhesive to provide cohesive and adhesive tack does not depend upon the presence of a sulfur curing system; however, the latter should be supplied when cured adhered composite articles are desired. The conventional metal oxides (e.g., zinc oxide) and accelerators are necessary for a cure. Since sulfur can migrate during the cure from the copolymer stock being adhered, sulfur is not a necessary component of the adhesive composition.

The low-Mooney α-olefin copolymer is often compounded with a sulfur curing system and a carbon black or mineral filler. A typical stock contains

| | Parts by weight |
|---|---|
| Low-Mooney α-olefin copolymer | 100 |
| Black | 40–60 |
| Zinc oxide | 5 |
| Naphthenic petroleum oil | 40–80 |
| Sulfur | 0.2 |
| Tetramethylthiuram monosulfide | 1.5 |
| 2-mercaptobenzothiazole | 0.75 |

The amount and the type of filler used will depend upon the use for the particular stock and can be varied by those skilled in the art by routine experimentation. Generally, 20–300 and frequently 40–60 parts of carbon black are supplied for each 100 parts by weight of the low Mooney copolymer in order to obtain bonds of greater strength. Furnace process carbons such as SAF and HAF black are preferred; other furnace blacks such as SRF, HFM, CF and FF can also satisfactorily be used. Typical suitable channel black include EPC, MPC, HPC, CC. Thermal carbons can be employed but are not as suitable as the above-mentioned types.

In general, the total amount of material which can be present along with the α-olefin copolymer and the conjugated diene elastomer in the adhesive composition can be varied widely. Any amount is suitable as long as the tacky quality of the adhesive and the bond strength of the cured adhered assemblies are not adversely affected. The practical limits for a particular system can readily be found by routine experiments. Although the compounding ingredients are often present in the α-olefin copolymer before the adhesive composition is made, it is possible to disperse them in a solution of part or all of the polymeric components.

The adhesive can be compounded in any order. Thus, one can dissolve the low-Mooney α-olefin copolymer in one solvent and disperse the remaining components in one or more other solvents and then combine all of the mixtures; alternatively one can add the components at one time and disperse them simultaneously; the curing agents for the low-Mooney α-olefin copolymer are generally not in solution but remain well dispersed as a suspension of indefinite stability. The composition can be prepared at any convenient operating temperature; 20 to 40° C. is frequently a convenient range. If the relative concentrations of the three polymers are selected outside the specified range, the effectiveness of the composition as a tackifier and adhesive will fall off.

The inert organic liquid can be any solvent or mixture of solvents used conventionally to dissolve the polymeric components of the adhesive. The best solvent system for a particular combination of polymers can be determined by routine selection and testing. Aliphatic hydrocarbons such as n-hexane, cycloaliphatic hydrocarbons such as cyclohexane, and aromatic hydrocarbons such as benzene are representative examples of the media often selected for hydrocarbon polymers; trichloroethylene is the preferred medium. The amount of inert organic liquid can vary over a wide range and is largely determined by the particular requirements for each application. Typical dispersions are those in which the total polymeric component ranges from about 2 to 15 percent of the total weight of dispersion.

As mentioned above, elastomeric substrates can be bonded by interposing the adhesive system of the present invention between them and thereafter subjecting the assembly to curing conditions. In particular, the adhesive is useful for joining articles made from sulfur-curable, normally-solid, chain-saturated α-olefin hydrocarbon copolymers to articles made from conjugated diene elastomers. The α-olefin copolymers are made by reacting at least one α-monoolefin and at least one non-conjugated hydrocarbon diene. Any of the above-described α-olefin copolymers having about 0.3 to 2 C=C/kg. is suitable. The adhesive is most beneficial for use on articles made from copolymers having Mooney viscosities (ML–4/100° C.) above about 40; particularly those having Mooney viscosities above about 70. Articles made from any of the conjugated diene elastomers described above for use in the adhesive composition can be bonded to the sulfur-curable α-olefin copolymer articles with the novel adhesive composition.

The adhesive is applied in the conventional manner familiar to those skilled in the adhesive art; brushes, rollers, swabs and the like can be employed to spread the adhesive across the surface of the elastomers. The thickness of a particular coating needed will be somewhat a function of the solids content of the dispersion supplied; it is generally preferred that the amount of the adhesive supplied be sufficient to leave a dry coating about 1 to 5 mils thick. Those skilled in the art can determine by routine testing the best thickness to use for a particular application.

After the coating has been applied the volatile solvent is allowed to evaporate. This often requires half to two hours at 25 to 30° C. When the coating has dried, the coated articles are ready to use. The assembly (e.g., a high Mooney α-olefin copolymer, a diene rubber, and the intervening adhesive) is heated under pressure such as 10 to 500 p.s.i. When the assembly is press cured, the adhesive may be squeezed out excessively if the pressure is too high. It is, therefore, sometimes advantageous to apply a pressure below that at which this loss occurs, allow the cure to proceed for about 10 to 15 minutes, and finally restore and maintain the initially applied pressure for the remainder of the curing time.

The curing temperature used can generally be selected from those values recommended in the art for sulfur-curable α-olefin copolymers, natural rubber or styrene-butadiene rubber. Temperatures generally range between about 130 and 160° C. with about 150 to 160° C. being preferred. Cure times will range between about 15 to 45 minutes. The time will vary inversely with the temperature, higher temperatures usually requiring shorter cure times. Those skilled in the art can determine the best time by routine testing taking into account such factors as the conditions recommended in the art for the particular curing system being used.

The sulfur curing system which can be present in the novel adhesive composition contains a metal oxide, a curing accelerator and optionally sulfur. About 0.2 to 2, preferably 0.75 to 2 parts of sulfur are present for every 100 parts by weight of the α-olefin copolymer.

Concentrations above 2 parts are usually unnecessary. The concentration of the metal oxide is important since it, in conjunction with sulfur and accelerator, controls the ultimate state of bonding. At concentrations of 3 to 10 parts by weight of metal oxide (preferably, zinc oxide) per 100 parts by weight of the halogen substituted copolymer, the rate and state of cure are very satisfactory. Concentrations below 2 parts per 100 are sometimes less satisfactory for developing and maintaining adequate vulcanizate properties and concentrations above 10 parts per 100 are generally unnecessary. The best accelerators for the vulcanization are also the ones used for curing natural rubber. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyldithiocarbamic acid; the piperidine salt of pentamethylene-dithiocarbamic acid; 2 - mercaptothiazoline; 2 - mercaptobenzothiazole; N,N - diethylthiocarbamyl - 2 - mercaptobenzothiazole, and 2,2' - dithio - bisbenzothiazole. A representative and preferred accelerator includes tellurium diethyldithiocarbamate (1.5 parts) or tetra-methylthiuram disulfide (0.75 part). Those skilled in the art can select by routine empirical experiments the best combinations of accelerators when curing a particular assembly. In addition to the above-described components, the novel composition may include such optional components as conventional antioxidants.

The elastomers being adhered by the novel composition of the present invention must be compounded with appropriate curing agents. Thus, any of the above-described sulfur (or peroxide) curing systems can be added to the α-olefin hydrocarbon copolymer containing side-chain unsaturation (e.g., ethylene/propylene/1,4-hexadiene). The conjugated diene elastomers can be compounded according to the well-known recipes in the art for sulfur curing natural rubber and styrene-butadiene rubber and the like. It is to be understood that various modifications of the sulfur curing procedures may be employed depending upon the stock. Various procedures and modifications of sulfur curing are more particularly described in Encyclopedia of Chemical Technology, Kirk and Othmer, published in Inter-science Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, David and Blake, published by Reinhold Publishing Corp., New York. 1937, Chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

The neoprene stocks which are to be coated with the cement of the present invention are compounded according to the recipes well-known in the art. Further details are given in Introduction to Rubber Technology, supra at pages 340–348; Synthetic Rubber Technology, W. S. Penn, Maclaren and Sons, Ltd., London, 1960, vol. 1, pages 179–232; The Neoprenes, N. L. Catton, E. I. du Pont de Nemours & Co., Inc., Wilmington, Del. 1953; and The Applied Science of Rubber, supra at pages 346–370, 397–400, and 1015–1048.

The invention will now be described with reference to the following examples of specific embodiments thereof wherein parts and percentages are by weight unless otherwise specified.

EXAMPLE I

A. *Preparation of Adhesive Composition*

(1) *Preparation of low-Mooney α-olefin copolymer components.*—A low-Mooney α-olefin copolymer, component, (A), is made by mechanically peptizing a high-Mooney copolymer as follows. An ethylene/propylene/1,4-hexadiene copolymer having a Mooney viscosity (ML–4/100° C.) of about 85 and the approximate monomer unit composition of 52% ethylene, 44% propylene and 4% 1,4-hexadiene is prepared in tetrachloroethylene with a diisobutylaluminum chloride/vanadium oxytrichloride catalyst in accordance with the teachings of U.S. Patent 2,933,480. This high-Mooney copolymer is mechanically peptized to a Mooney viscosity (ML–4/100° C.) of about 16 by mastication for 150 minutes in a Banbury mixer, initially at about 177° C. and operated at about 230 r.p.m.

A second low-Mooney α-olefin copolymer, component (B), is prepared by the copolymerization of ethylene and 1,4-hexadiene in tetrachloroethylene with a vanadium tris(acetylacetonate)/diisobutylaluminum chloride catalyst in accordance with the general teachings of U.S. Patent 2,933,480. The copolymer has a Mooney viscosity (ML–4/100° C.) of about 25, an inherent viscosity of about 1.43 (measured on a 0.1% solution in tetrachloroethylene at 30° C.), and typically contains about 2.88 gram-moles of carbon-to-carbon double bonds per kilogram.

(2) *Preparation of the fluid adhesive.*—The following ingredients are compounded on a rubber roll mill at 75–100° F. to prepare the adhesive stock material.

| Ingredients: | Parts by weight |
| --- | --- |
| Low-Mooney Component (A) | 45 |
| Low-Mooney Component (B) | 30 |
| Natural Rubber Smoked Sheet | 25 |
| Zinc Oxide | 5 |
| HAF Carbon Black | 50 |
| Petroleum Oil [1] | 60 |
| Sulfur | 2.5 |
| 2 - mercaptobenzothiazole | 0.5 |

[1] This naphthenic petroleum oil (commercially available from Humble Oil and Refining Company as "Flexon 765"), had a flash point of 445° F., a specific gravity (60/60° F.) of 0.8980, a Saybolt viscosity (210° F.) of 58 seconds, a viscosity gravity constant of 0.834, 0% N-bases, 1.5% first acidaffins, 28.3% second acidaffins, 70.2% paraffins, 0% aromatic carbon atoms, 45% naphthenic carbon atoms and 55% paraffinic carbon atoms.

A fluid adhesive is prepared by adding 50 grams of the above stock (in the form of 1 x 4 x 0.2-inch strips) to 120 grams of trichloroethylene in a jar containing porcelain balls. The jar is then rotated for at least 36 hours at 25–30° C. until a smooth dispersion is obtained.

B. *Preparation of tread, carcass, and white-wall stocks*

(1) Stocks all principally based on high-Mooney α-olefin hydrocarbon copolymer are prepared by compounding the following ingredients on a rubber roll mill at 75–100° F.:

| Ingredient | Parts by Weight | | |
| --- | --- | --- | --- |
|  | Tread | Carcass | White-wall |
| High-Mooney α-olefin copolymer of A (1) above | 100 | 100 | 95 |
| Chlorosulfonated Polyethylene [1] | 0 | 0 | 5 |
| Chlorovis 150A [2] | 0 | 10 | 10 |
| Zinc Oxide | 5 | 5 | 5 |
| Stearic Acid | 1 | 1 | 0 |
| HAF Carbon Black | 72 | 72 | 0 |
| Super Multifex [3] | 0 | 0 | 70 |
| TiO₂ (rutile) | 0 | 0 | 40 |
| Naphthenic Petroleum Oil (of part (2) above) | 40 | 40 | 40 |
| 2,6-di-tert-butyl-4-phenylphenol antioxidant | 0 | 0 | 2 |
| Aquamarine Blue | 0 | 0 | 0.2 |
| Sulfur | 1.5 | 1.5 | 1.5 |
| Tetramethyl thiuram monosulfide | 1.5 | 1.5 | 1.5 |
| 2-mercaptobenzothiazole | 0.75 | 0.75 | 0.75 |

[1] The chlorosulfonated polyethylene (made in accordance with the procedures of U.S. Patents 2,586,363 and 2,862,917) analyzed for 1.0% sulfur and 26.5% chlorine by weight; the polyethylene before chlorosulfonation had a density of 0.96 g./cc. and a melt index of about 0.7.
[2] A liquid chlorinated paraffin (commercially available from Dover Chemical Corp., Ohio) having 44–45% chlorine by weight.
[3] An ultra-fine, surface coated calcium carbonate; particle size 0.03 micron; commercially available from Diamond Alkali Co.

(2) A styrene-butadiene (SBR) carcass stock is compounded by mixing the following ingredients on a rubber roll mill at 75–100° F.

| Ingredient: | Parts by weight |
| --- | --- |
| SBR 1500 [1] | 80 |
| Natural rubber (smoked sheet) | 100 |
| Midco B [2] | 44 |
| RPA No. 6 [3] | 1 |
| Zinc oxide | 8 |
| Stearic acid | 4 |
| SRF carbon black | 86 |
| Naphthenic petroleum oil [4] | 10 |
| Sulfur | 44 |
| Barak [5] | 1.6 |
| 2,2'-dithiobisbenzothiazole | 2 |

[1] A styrene/1,3-butadiene copolymer having about 23.5 weight percent styrene units, a Mooney viscosity (ML–4/100° C.) of about 46–54 and a viscosity-average molecular weight of about 270,000.
[2] Whole tire reclaim (containing SBR, natural rubber, carbon black, processing oils).
[3] Peptizing agent (active ingredient pentachlorothiophenol) commercially available from Du Pont as a light gray powder having a specific gravity of 1.79.
[4] This naphthenic petroleum oil (commercially available from Sun Oil Co. as "Circo" light process oil) has a flash point of 330° F., a specific gravity (60/60° F.) of 0.9242, a viscosity-gravity constant of 0.887, less than 15% N-bases and first acidaffins, 20% aromatic carbon atoms, 40% naphthenic carbon atoms, and 40% paraffinic carbon atoms.
[5] An activator and processing aid commercially available from Du Pont Co.; the active ingredient is dibutyl ammonium oleate; it is supplied as a liquid having a flash point of 215° F. and a specific gravity of 0.88.

C. *Preparation of uncured assemblies*

A series of uncured assemblies may be prepared by brushing an even coating, about 1–5 mils thick, of the adhesive of Part A above onto the surface of the elastomer stock (1 x 4 x 0.2-inch) and allowed to dry overnight at 25° C. The coated stock is then pressed against a second stock (optionally, also coated) by rolling it with a 2-lb. weight 4–5 times. The weight is then removed. After about 2–5 minutes the cohesion of the resulting assembly is tested by pulling the layers apart by hand.

In the following table the tread, carcass, and white-wall stocks are all prepared from the high-Mooney α-olefin copolymer described in Part A (1) above and compounded as in Part B (1) above:

TABLE I(a)

| Elastomer Assembly | Coated Member | Cohesive Tack |
|---|---|---|
| Tread/Carcass | Tread only | Good. |
| Do | Both | Excellent. |
| White-wall/Carcass | White-wall only | Good. |
| Do | Both | Very Good. |

In the following table the tread and white-wall stocks are prepared from high-Mooney α-olefin copolymer and compounded as in Part B (1) but the carcass stock is prepared from SBR as in Part B (2).

TABLE I(b)

| Elastomer Assembly | Coated Member | Adhesive Tack |
|---|---|---|
| Tread/SBR Carcass | Tread only | Excellent. |
| White-wall/SBR Carcass | White-wall only | Do. |

D. Preparation of cured assemblies 1 x 4 x 0.2-inch slabs of high-Mooney α-olefin carcass, tread and white-wall stocks of Part B (1) and SBR carcass stock of Part B (2) are swabbed with cyclohexane and dried. Then a thick layer of the adhesive of Part A (2) is applied to one side of each copolymer slab and dried at 25–30° C. for 1 hour to give a coating 2–3 mils thick. Canvas backing was attached to the uncoated sides by means of a conventional adhesive. The assemblies, made by placing the coated sides together, are cured in a 1 x 4-inch plunger mold at 500 lb./sq. in. for 30 minutes at about 307° F. Typical resulting bond strengths are reported in Table I(c) wherein all tread, white-wall and carcass stocks are of α-olefin copolymer except as designated SBR:

TABLE I(c)

Cured elastomer assembly: Peel strength (lb./linear in.) at 25° C.
- Tread/carcass _____ 23
- White-wall carcass _____ 40
- Tread/SBR carcass _____ 26
- White-wall/SBR carcass _____ 21

EXAMPLE II

A fluid adhesive is prepared in exactly the same way as that in Part A of Example I except that 1.5 parts of tetramethyl thiuram disulfide are used instead of 1.5 parts of tetramethyl thiuram monosulfide.

The above adhesive is used to prepare uncured assemblies in the same manner as Part C of Example I using the stocks of Part B of that example. In the following table the tread, carcass and white-wall stocks are of α-olefin copolymer except as specifically designated SBR:

TABLE II

| Uncured Elastomer Assembly | Coated Component | Cohesive Tack |
|---|---|---|
| Tread/Carcass | Tread Only | Fair. |
| Do | Both | Excellent. |
| White-wall/Carcass | White-wall only | Good. |
| Do | Both | Excellent. |
| Tread Stock/SBR Carcass | Tread only | Good. |
| Do | White-wall only | Do. |

EXAMPLE III

A. Preparation of fluid adhesive III-A-1 and III-A-2

The following ingredients are mixed on a rubber roll mill at 150° F.

| Ingredient: | Parts by weight |
|---|---|
| Low-Mooney Component A (of Ex. I) | 45 |
| Low-Mooney Component B (of Ex. I) | 30 |
| Natural rubber smoked sheet | 25 |
| Zinc oxide | 5 |
| HAF carbon black | 50 |

The compounding is continued on a cold mill at 75–100° F. by adding the following ingredients:

| Ingredient | Parts by Weight | |
|---|---|---|
| | III-A-1 | III-A-2 |
| Tetramethylthiuram Monosulfide | 1 | 1 |
| 2,2'-dithiobisbenzothiazole | 0.5 | 0.5 |
| Petroleum Oil A | 60 | 0 |

Fluid adhesives III-A-1 and 2 are prepared by dissolving 100 grams of the corresponding stocks in 1000 grams of trichloroethylene by placing 1 x 4 x 0.2-inch strips of the stocks in jars containing the solvent and porcelain balls. Each jar is then rotated on a set of moving rollers for about 16 hours at about 25–30° C. (mixing is continued until the dispersion is smooth).

B. Preparation of uncured assemblies

Stocks of the high-Mooney α-olefin copolymer of Part A (1) of Example I are coated and a series of uncured assemblies are prepared and tested qualitatively for adhesive tack by the general procedure set out in Example I. The tread and white-wall are from the α-olefin copolymer and the carcass is prepared using SBR. The following typical results are obtained:

| Elastomer Assembly | Adhesive Used | Adhesive Tack |
|---|---|---|
| Tread/SBR Carcass | III-A-1 | Very good. |
| White-wall/SBR Carcass | III-A-1 | Excellent. |
| Tread SBR Carcass | III-A-2 | Good. |
| White-wall/SBR Carcass | III-A-2 | Do. |

C. Preparation of cured assemblies

Samples of the α-olefin copolymer tread stock and white-wall stock, and the SBR carcass stock, described in Example I, are cut into 1 x 4 x 0.15-inch slabs. After each slab has been wiped with cyclohexane and allowed to dry, canvas backing is attached to one side by means of a conventional adhesive. One brush coat of the adhesive compositions III-A-1 and III-A-2 is applied to the other sides of the copolymer stocks and allowed to dry for 16 hours at 25–30° C. Assemblies are made as shown below in the table and cured in a 1 x 4-inch plunger mold at 450 p.s.i. for 30 minutes at 307° F. The resulting bond strengths are as follows:

| Cured Elastomer Assembly | Adhesive Used | Peel Strength (lbs./linear inch at 25° C. |
|---|---|---|
| Tread/SBR Carcass | III-A-1 | 13 |
| White-wall/SBR Carcass | III-A-1 | 30 |
| Tread/SBR Carcass | III-A-2 | 10 |
| White-wall/SBR Carcass | III-A-2 | 50 |

From the foregoing examples one skilled in the art would know how to use the novel compositions of this invention to join various α-olefin hydrocarbon copolymer articles to any of a wide variety of sulfur-curable elastomers.

The following method is used in determination of the C=C content of the copolymers used in the above examples.

Bromine is allowed to react with a weighed copolymer sample, a potassium iodide solution is added, and the excess bromine is determined by treating the liberated iodine with standard sodium thiosulfate. Potassium iodate is added, and the sample is again titrated to find the extent of substitution.

Twenty-five milliliters of a solution of 5 ml. bromine in one liter of $CCl_4$ is added to a solution of copolymer in 50 ml. of $CCl_4$ at 25° C. in an iodine flask. The flask is stoppered (the stopper then being covered with a few milliliters of 25% aqueous KI) and placed in the dark for two hours at 25° C. Then, the KI solution and about 25 ml. of additional 25% aqueous KI are introduced into the flask. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer.

$$\text{The total bromine moles/kg.} = \frac{(B-T)0.1}{2 \text{ (grams of copolymer)}}$$

where

B=ml. 0.1 sodium thiosulfate used to 1st end point (before $KIO_3$ addition) of blank solution
T=ml. 0.1 N sodium thiosulfate used to 1st end point (before $KIO_3$ addition) of copolymer solution $$\text{The bromine consumed by substitution moles/kg.} = \frac{[(M-H)]0.1}{\text{(grams of copolymer)}}$$

where

M=ml. 0.1 sodium thiosulfate added after $KIO_3$ solution introduced into copolymer solution
H=ml. 0.1 sodium thiosulfate added after $KIO_3$ solution introduced into blank solution.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. An adhesive composition suitable for bonding normally-solid α-olefin hydrocarbon copolymers having a Mooney viscosity above 70 to elastomeric surfaces, which composition comprises a dispersion in an inert organic solvent of (1) a conjugated diene elastomer having at least about 10 gram-moles of sulfur-curable carbon-to-carbon double bonds per kilogram; and (2) a sulfur curable α-olefin hydrocarbon copolymer component comprising a blend of (a) a low molecular weight hydrocarbon copolymer of at least one α-monoolefin and at least one non-conjugated diene having a Mooney viscosity below about 25 and having from about 0.3 to 2 gram-moles of sulfur-curable carbon-to-carbon double bonds per kilogram, and (b) a high diene hydrocarbon copolymer of at least one α-monoolefin and at least one non-conjugated diene having a Mooney viscosity below about 50 and having at least about 2.4 gram-moles of carbon-to-carbon double bonds per kilogram; said low molecular weight copolymer (a) ranging from about 40 to 50 percent and said high-diene copolymer (b) ranging from about 25 to 35 percent, both based on the total weight of ingredients (1) and (2).

2. A composition as defined in claim 1 wherein said conjugated diene elastomer (1) is natural rubber; said low molecular weight hydrocarbon copolymer (a) is a copolymer of ethylene, propylene and 1,4-hexadiene; and said high-diene copolymer (b) is a copolymer of ethylene and 1,4-hexadiene.

References Cited

UNITED STATES PATENTS

| | | | |
|---|---|---|---|
| 2,467,322 | 4/1949 | Lightbown et al. | 260—5 |
| 2,933,480 | 4/1960 | Gresham et al. | 260—80.5 |
| 3,224,985 | 12/1965 | Gladding et al. | 260—889 |

OTHER REFERENCES

Burhans et al., Improved Rubber Tack With Phenolic Resins, "Rubber Age," 92, February 1963, pages 745–748.

GEORGE F. LESMES, *Primary Examiner.*

MURRAY TILLMAN, *Examiner.*

M. J. TULLY, *Assistant Examiner.*

UNITED STATES PATENT OFFICE
CERTIFICATE OF CORRECTION

Patent No. 3,364,155

January 16, 1968

Robert David Souffie

It is hereby certified that error appears in the above numbered patent requiring correction and that the said Letters Patent should read as corrected below.

Column 7, after line 62, insert -- Tetramethyl thiuram monosulfide ------1.5 --; column 9, TABLE II, first column, line 6 thereof, for "Do" read -- White Stock/SBR Carcass --; column 10, second table, first column, line 2 thereof, for "Wh te-wall" read -- White-wall --; column 11, line 31, for "0.1 sodium" read -- 0.1 N sodium --.

Signed and sealed this 27th day of May 1969.

(SEAL)
Attest:

Edward M. Fletcher, Jr.

Attesting Officer

Commissioner of Patents